(12) United States Patent
Johnson

(10) Patent No.: US 10,194,580 B2
(45) Date of Patent: Feb. 5, 2019

(54) REMOVABLE AIR SCREEN FOR AN AGRICULTURAL METER HOUSING

(71) Applicant: CNH Industrial America LLC, New Holland, PA (US)

(72) Inventor: Chad M. Johnson, Arlington Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 54 days.

(21) Appl. No.: 15/409,268

(22) Filed: Jan. 18, 2017

(65) Prior Publication Data

US 2017/0208735 A1 Jul. 27, 2017

Related U.S. Application Data

(60) Provisional application No. 62/286,203, filed on Jan. 22, 2016.

(51) Int. Cl.
*A01C 7/20* (2006.01)
*A01C 7/04* (2006.01)

(52) U.S. Cl.
CPC ............... *A01C 7/20* (2013.01); *A01C 7/044* (2013.01); *A01C 7/046* (2013.01)

(58) Field of Classification Search
CPC .. A01C 7/20; A01C 7/00; A01C 7/044; A01C 7/042; A01C 7/04; A01C 7/046
See application file for complete search history.

(56) References Cited

U.S. PATENT DOCUMENTS

| | | |
|---|---|---|
| 6,176,393 B1 | 1/2001 | Luxon |
| 6,675,728 B2 | 1/2004 | Lee et al. |
| 6,739,272 B2 | 5/2004 | Crabb et al. |
| 6,935,255 B2 | 8/2005 | Hagen et al. |
| 7,938,072 B2 | 5/2011 | Wilhelmi et al. |
| 8,677,915 B2 | 3/2014 | Riggs |
| 8,714,344 B2 | 5/2014 | Kowalchuk et al. |
| 9,072,217 B2 | 7/2015 | Kapphahn |
| 9,237,687 B2 | 1/2016 | Sauder et al. |
| 2014/0174330 A1 | 6/2014 | Garner et al. |
| 2015/0250095 A1 | 9/2015 | Noack et al. |

(Continued)

FOREIGN PATENT DOCUMENTS

| | | |
|---|---|---|
| WO | 2015052205 | 4/2015 |
| WO | 2015171915 | 11/2015 |

OTHER PUBLICATIONS

Pasikatan et al., "A Compact Triple-Airstream, Triple-Screen Rice Seed Cleaner," Crop Science Society of the Phillippines, 1996, 53-60 pgs., vol. 21 (3), Phillip J. Crop Sci.

(Continued)

*Primary Examiner* — Christopher J. Novosad
(74) *Attorney, Agent, or Firm* — Rebecca L. Henkel; Rickard K. DeMille

(57) ABSTRACT

An agricultural product metering system includes an air screen configured to selectively cover an opening in an agricultural meter housing extending from an external environment to an interior of the agricultural meter housing. The air screen has at least one mounting feature on at least one peripheral side of the air screen, and the at least one mounting feature of the air screen is configured to engage at least one corresponding mounting feature on at least one peripheral side of the opening in the agricultural meter housing to removably couple the air screen to the agricultural meter housing.

20 Claims, 6 Drawing Sheets

(56) References Cited

U.S. PATENT DOCUMENTS

2015/0282422 A1 10/2015 Hahn et al.
2015/0319916 A1 11/2015 Garner et al.

OTHER PUBLICATIONS

Roche, "Small or Large, Grass Seeders Are More Sophisticated Than Ever," Landscape & Irrigation, Apr. 2000, 4 pgs., vol. 24, Issue 4, Bev-AL Communications Inc.
Jennings, "Seed Meter Care and Maintenance," Kinze, Jan. 15, 2014, 4 pgs.
Dakota Farm Equipment, Inc., "1910 Air Cart Maintenance & Optimization," Jan. 27, 2016, 65 pgs.
SHOUP Manufacturing, "SH45020 Precision Seed Meter and Tube Kit," Jan. 27, 2016, 1 pg.
U.S. Appl. No. 29/591,274, filed Jan. 18, 2017, Johnson.

REMOVABLE AIR SCREEN FOR AN AGRICULTURAL METER HOUSING

CROSS REFERENCE TO RELATED APPLICATION

This application claims priority from and the benefit of U.S. Provisional Application Ser. No. 62/286,203, entitled "REMOVABLE AIR SCREEN FOR AN AGRICULTURAL METER HOUSING", filed Jan. 22, 2016, which is hereby incorporated by reference in its entirety.

BACKGROUND

The invention relates generally to a removable air screen for an agricultural meter housing.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product conveying system (e.g., seed tube) is configured to deposit seeds and/or other agricultural products (e.g., fertilizer) into the trench. The opener/agricultural product conveying system is followed by closing discs that move displaced soil back into the trench and/or a packer wheel that packs the soil on top of the deposited seeds.

Certain row units also include an agricultural meter configured to control the flow of agricultural product through the agricultural product conveying system. For example, the agricultural meter (e.g., vacuum seed meter) may include a disc having multiple openings. In such a configuration, an air pressure differential between opposite sides of the disc induces the agricultural product (e.g., seeds) to be captured within the openings. As the disc rotates, the agricultural product is conveyed toward the agricultural product conveying system. When the agricultural product (e.g., seed) is aligned with an inlet to the agricultural product conveying system, the pressure between opposite sides of the disc is equalized (e.g., at the end of a vacuum passage), thereby enabling the agricultural product (e.g., seed) to enter the agricultural product conveying system (e.g., seed tube). The agricultural product conveying system then directs the agricultural product to the trench.

To establish a higher pressure on one side of the disc (e.g., the side opposite the vacuum passage), a housing of the agricultural meter includes openings that facilitate air flow into the housing. The openings are sized to substantially block the agricultural product from flowing out of the housing and to substantially block debris (e.g., rocks, crop residue, etc.) from entering the housing. Unfortunately, under certain field conditions, the openings may become blocked by debris (e.g., crop residue) from a field, thereby reducing the pressure differential between sides of the disc. As a result, the effectiveness of the agricultural meter may be reduced.

BRIEF DESCRIPTION

In one embodiment, an agricultural product metering system includes an agricultural meter housing having an opening extending from an external environment to an interior of the agricultural meter housing. The agricultural meter housing also has at least one mounting feature on at least one peripheral side of the opening. In addition, the agricultural product metering system includes an air screen configured to removably couple to the agricultural meter housing to selectively block the opening. The air screen includes at least one corresponding mounting feature on at least one peripheral side of the air screen, and the at least one corresponding mounting feature of the air screen is configured to engage the at least one mounting feature of the agricultural meter housing to removably couple the air screen to the agricultural meter housing.

In another embodiment, an agricultural product metering system includes an air screen configured to selectively cover an opening in an agricultural meter housing extending from an external environment to an interior of the agricultural meter housing. The air screen has at least one mounting feature on at least one peripheral side of the air screen, and the at least one mounting feature of the air screen is configured to engage at least one corresponding mounting feature on at least one peripheral side of the opening in the agricultural meter housing to removably couple the air screen to the agricultural meter housing.

In a further embodiment, an agricultural product metering system includes an agricultural meter housing having an opening extending from an external environment to an interior of the agricultural meter housing. The agricultural meter housing also includes at least one mounting feature on at least one peripheral side of the opening. The at least one mounting feature of the agricultural meter housing is configured to engage at least one corresponding mounting feature on at least one peripheral side of an air screen to removably couple the air screen to the agricultural meter housing such that the air screen covers the opening.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
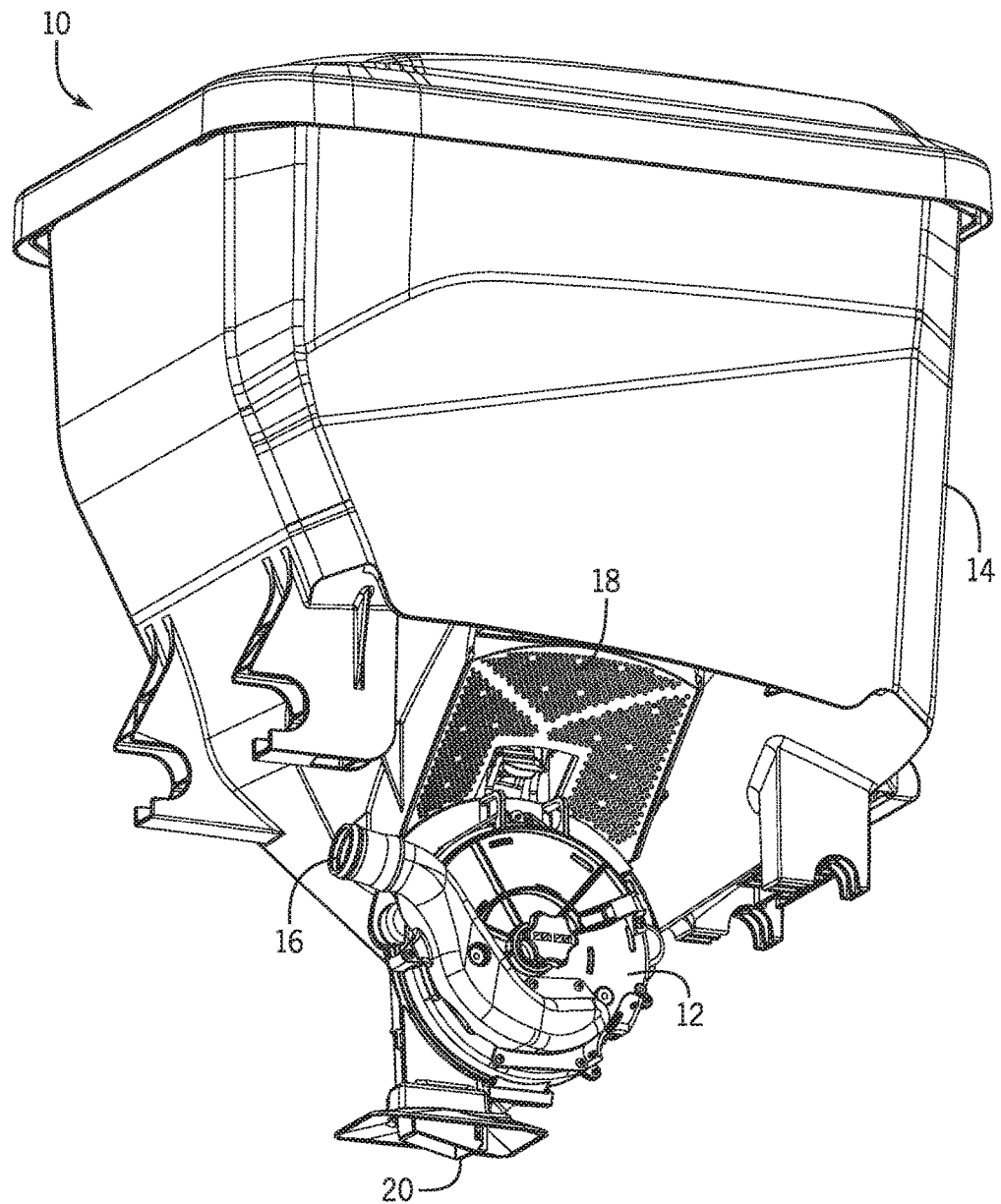
FIG. 1 is a perspective view of an embodiment of an agricultural product metering system including an agricultural meter and a hopper coupled to the agricultural meter.

FIG. 1 is a perspective view of an embodiment of an agricultural product metering system 10 including an agricultural meter 12 (e.g., vacuum seed meter) and a hopper 14 coupled to the agricultural meter 12 (e.g., via a latch system). The agricultural meter 12 is configured to receive agricultural product (e.g., seeds) from the hopper 14. In certain embodiments, the agricultural meter 12 includes a disc having multiple openings. An air pressure differential between opposite sides of the disc induces the agricultural product (e.g., seeds) to be captured within the openings. As the disc rotates, the agricultural product is conveyed toward an agricultural product conveying system (e.g., seed tube). When the agricultural product (e.g., seed) is aligned with an inlet to the agricultural product conveying system, the pressure between opposite sides of the disc is equalized (e.g., at the end of a vacuum passage), thereby enabling the agricultural product (e.g., seed) to enter the agricultural product conveying system (e.g., seed tube).

In the illustrated embodiment, the agricultural meter 12 includes an opening 16 configured to couple to a vacuum line, which in turn, is coupled to a vacuum source. The vacuum source is configured to reduce the air pressure on one side of the disc, thereby establishing the air pressure differential that induces the agricultural product (e.g., seeds) to be captured within the openings. The other side of the disc is in fluid communication with the ambient air. In the illustrated embodiment, the hopper 14 includes a screen 18 configured to facilitate flow of ambient air to the agricultural meter 12. In certain embodiments, the hopper includes air passages that extend between the screen 18 and air inlets of the agricultural meter 12. The screen 18 may be configured to facilitate air flow to the agricultural meter 12 while blocking the agricultural product from exiting the agricultural product metering system 10. As used herein, "vacuum" refers to an air pressure that is less than the ambient atmospheric air pressure, and not necessarily 0 pa.

As previously discussed, the agricultural meter 12 is configured to meter agricultural product (e.g., seed) to an agricultural product conveying system (e.g., seed tube). Accordingly, the agricultural meter 12 includes an outlet 20 configured to interface within an inlet to the agricultural product conveying system. In certain embodiments, the agricultural product conveying system is an element of a row unit. The row unit may include a frame configured to support the agricultural product metering system 10. In addition, the row unit may include a ground engaging tool or opener that forms a trench for deposition of the agricultural product (e.g., seed) into the soil. The agricultural product conveying system (e.g., seed tube) may be positioned behind the opener and configured to deposit the agricultural product into the trench. The opener/agricultural product conveying system may be followed by closing discs that move displaced soil back into the trench and/or a packer wheel that packs the soil on top of the deposited agricultural product.

Figure 2:
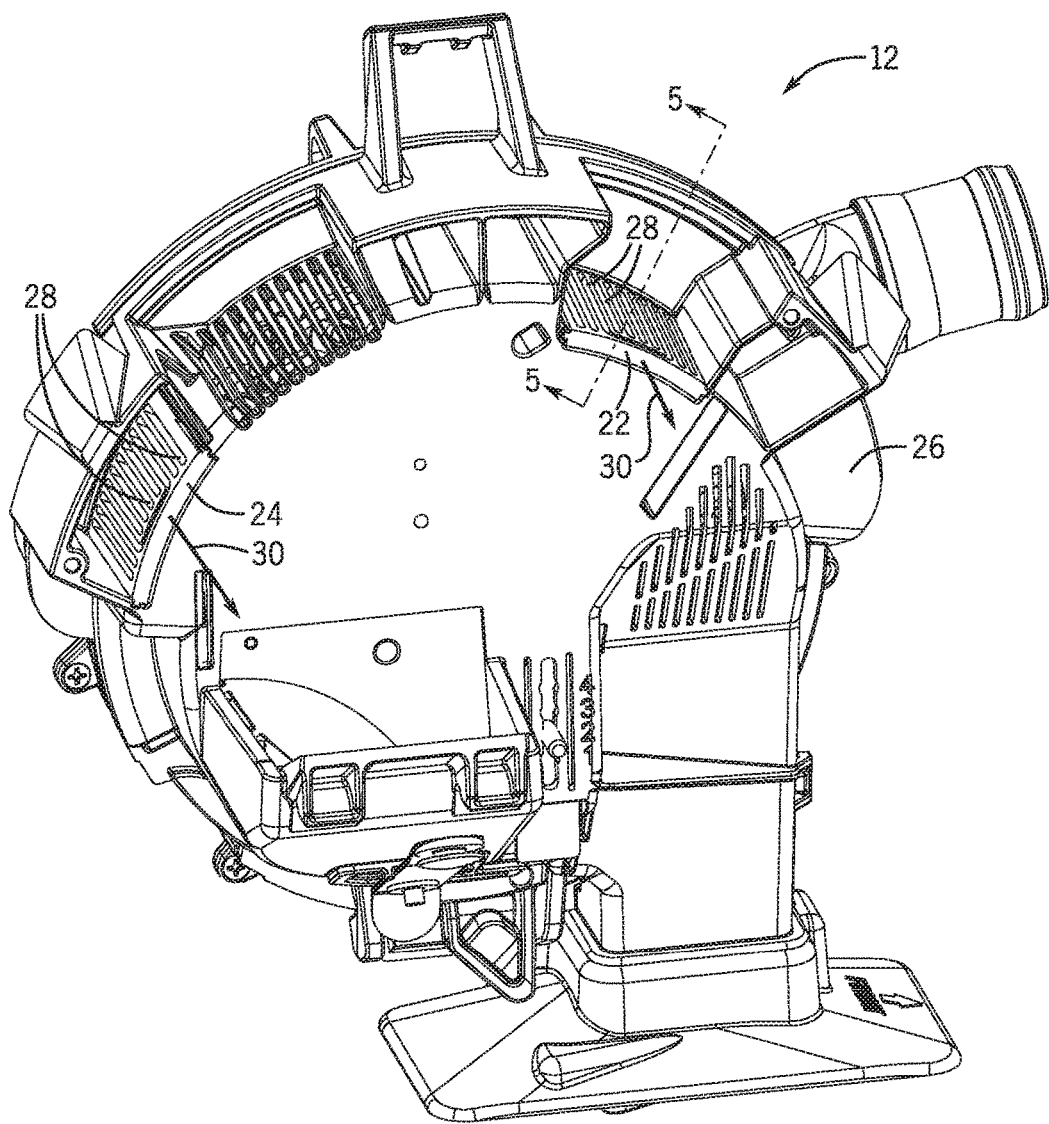
FIG. 2 is a perspective view of the agricultural meter of FIG. 1, in which a first removable screen and a second removable screen are coupled to a housing of the agricultural meter.

FIG. 2 is a perspective view of the agricultural meter 12 of FIG. 1, in which a first removable screen 22 (e.g., air screen) and a second removable screen 24 (e.g., air screen) are coupled to a housing 26 of the agricultural meter 12. In the illustrated embodiment, each removable screen includes multiple slots 28 configured to facilitate air flow (e.g., from air passages within the hopper) into the agricultural meter housing 26. In certain embodiments, the width of each slot 28 is selected to substantially block debris from entering the agricultural meter housing 26 (e.g., reduce an amount of debris entering the agricultural meter housing 26, reduce the possibility of certain debris from entering the agricultural meter housing 26, etc.) and to substantially block agricultural product from exiting the agricultural meter housing 26 (e.g., reduce an amount of agricultural product exiting the agricultural meter housing 26, reduce the possibility of certain agricultural products from exiting the agricultural meter housing 26, etc.).

In certain field conditions, the first removable screen 22 and/or the second removable screen 24 may be removed from the agricultural meter housing 26 (e.g., via translation in the direction 30). For example, when operating the agricultural product metering system in a field with a significant amount of debris (e.g., crop residue), the slots of the removable air screen(s) may become blocked by the debris, thereby reducing the pressure differential between the sides of the agricultural meter disc. Accordingly, prior to operating the agricultural product metering system in such field conditions, the first removable screen 22 and/or the second removable screen 24 may be removed from the agricultural meter housing 26. Removing the first removable screen 22 and/or the second removable screen 24 exposes respective opening(s) in the agricultural meter housing 26, thereby facilitating air flow into the agricultural meter. As a result, the pressure differential between sides of the disc may be maintained. Because the openings in the agricultural meter housing 26 are fluidly downstream from the hopper screen 18, the size of the debris (e.g., crop residue, etc.) passing through the openings may be relatively small (e.g., as compared to larger debris, such as rocks, twigs, etc.), the debris may pass through the agricultural meter without significantly interfering with planting operations.

Figure 3:
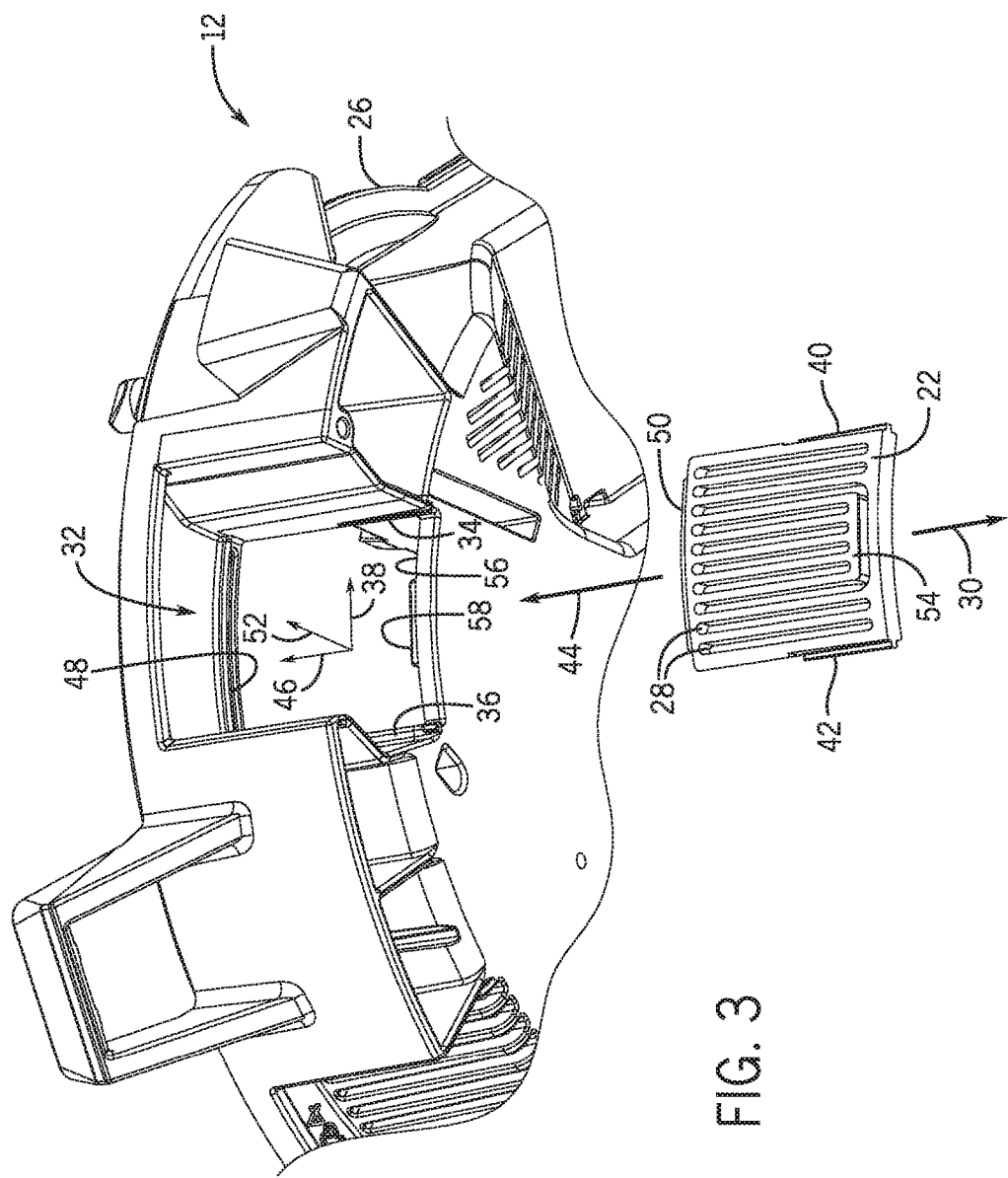
FIG. 3 is a perspective view of a portion of the housing and the first removable screen of FIG. 2, in which the first removable screen is removed from the housing.

FIG. 3 is a perspective view of a portion of the housing 26 and the first removable screen 22 of FIG. 2, in which the first removable screen 22 is removed from the housing 26. As previously discussed, removing the first removable screen 22 from the agricultural meter housing 26 exposes an opening 32 that extends from an external environment (e.g., an environment external to the agricultural meter housing 26) to an interior of the agricultural meter housing 26 (e.g., the opening facilitates air flow from the external environment into the interior of the agricultural meter housing). In the illustrated embodiment, the agricultural meter housing 26 includes a first recess 34 (e.g., mounting feature) on a first lateral side (e.g., peripheral side) of the opening 32 and a second recess 36 (e.g., mounting feature) on a second lateral side (e.g., peripheral side) of the opening 32, opposite the first lateral side of the opening 32 along a lateral axis 38. In addition, the first removable screen 22 includes a first protrusion 40 (e.g., mounting feature) on a first lateral side (e.g., peripheral side) of the first removable screen 22 and a second protrusion 42 (e.g., mounting feature) on a second lateral side (e.g., peripheral side) of the first removable screen 22, opposite the first lateral side of the first removable screen 22 along the lateral axis 38. The first and second protrusions 40 and 42 are configured to engage the first and second recesses 34 and 36, respectively, via translation of the first removable screen 22 in a direction 44 along a longitudinal axis 46.

In the illustrated embodiment, an extent of the first recess 34 along the longitudinal axis 46 and an extent of the second recess 36 along the longitudinal axis 46 are less than an extent of the opening 32 along the longitudinal axis 46. In addition, an extent of the first protrusion 40 along the longitudinal axis 46 and an extent of the second protrusion 42 along the longitudinal axis 46 are less than an extent of the first removable screen 22 along the longitudinal axis 46. For example, in certain embodiments, the longitudinal extent of the first and second recesses may be 10 percent to 90 percent, 20 percent to 80 percent, 30 percent to 70 percent, or 40 percent to 60 percent of the longitudinal extent of the opening. Furthermore, in certain embodiments, the longitudinal extent of the first and second protrusions may be 10 percent to 90 percent, 20 percent to 80 percent, 30 percent to 70 percent, or 40 percent to 60 percent of the longitudinal extent of the first removable screen. In further embodiments, the longitudinal extent of the first and second recesses may be substantially equal to the longitudinal extent of the opening, and/or the longitudinal extent of the first and second protrusions may be substantially equal to the longitudinal extent of the first removable screen.

In addition, the agricultural meter housing 26 includes a third recess 48 (e.g., mounting feature) on a first longitudinal side (e.g., peripheral side) of the opening 32, and the first removable screen 22 includes a third protrusion 50 (e.g., mounting feature) on a first longitudinal side (e.g., peripheral side) of the first removable screen 22. The third protrusion 50 is configured to engage the third recess 48 to block movement of the first longitudinal side of the first removable screen 22 along a vertical axis 52 relative to the agricultural meter housing 26. In addition, contact between the first and second protrusions 40 and 42 and the first and second recesses 34 and 36 block movement of a second longitudinal side of the first removable air screen 22 along the vertical axis 52 relative to the agricultural meter housing 26. In certain embodiments, the third protrusion 50 and the third recess 48 may be omitted (e.g., in embodiments in which the first and second protrusions 40 and 42 extend along a substantial portion of the longitudinal extent of the first removable screen 22).

As used herein, "peripheral side" refers to a side extending along the periphery of the opening or the removable screen (e.g., each lateral side, each longitudinal side). In addition, while the illustrated removable screen includes a protrusion on each lateral side of the removable screen, and the agricultural meter housing includes a recess on each lateral side of the opening, it should be appreciated that in alternative embodiments, the removable screen may include a recess on at least one lateral side of the removable screen, and the agricultural meter housing may include a corresponding protrusion on at least one lateral side of the opening. Furthermore, while the illustrated removable screen includes a protrusion on the first longitudinal side of the removable screen, and the agricultural meter housing includes a recess on the first longitudinal side of the opening, it should be appreciated that in alternative embodiments, the removable screen may include a recess on the first longitudinal side of the removable screen, and the agricultural meter housing may include a corresponding protrusion on the first longitudinal side of the opening. In further embodiments, the agricultural meter housing and the removable screen may have one or more other suitable mounting features (e.g., in addition to the protrusion(s)/recess(es) or instead of the protrusion(s)/recess(es)), such as fastener(s)/opening(s), respective elements of a latch assembly/assemblies, etc.

In the illustrated embodiment, the first removable screen 22 includes a flexible portion 54 configured to flex upwardly and downwardly along the vertical axis 52. As discussed in detail below, the flexible portion 54 includes an extension configured to contact an inner surface 56 of the agricultural meter housing 26 at the second longitudinal end of the opening. Contact between the extension and the inner surface 56 blocks movement of the first removable screen 22 in the direction 30 along the longitudinal axis 46. In addition, the agricultural meter housing 26 includes a lip 58 extending from the inner surface 56. The lip 58 is configured to contact the extension to block downward movement of the flexible portion 54 along the vertical axis 52 (e.g., in response to a force applied by an operator while removing debris from the first removable screen 22). To remove the first removable screen 22 from the agricultural meter housing 26, the flexible portion may be driven (e.g., manually) upwardly along the vertical axis 52 until the extension is positioned vertically above the inner surface 56. The first removable screen 22 may then be removed from the agricultural meter housing 26 via translation in the direction 30.

As previously discussed, the first removable screen 22 includes multiple slots 28 to facilitate air flow into the agricultural meter 12. In the illustrated embodiment, each slot 28 is oriented along the longitudinal axis 46. However, it should be appreciated that in alternative embodiments, one or more of the slots may be oriented at an angle (e.g., 30 degrees, 60 degrees, 90 degrees, etc.) relative to the longitudinal axis. In addition, further embodiments may include more or fewer slots, and/or wider or narrower slots. In addition, in certain embodiments, the first removable screen 22 may include openings having other shapes, such as circular, rectangular, and elliptical, among others (e.g., in addition to slots and/or as an alternative to the slots).

In the illustrated embodiment, a curvature of the first removable screen 22 about the longitudinal axis 46 is substantially equal to a curvature of a portion of the agricultural meter housing 26 surrounding the opening about the longitudinal axis 46. However, it should be appreciated that in alternative embodiments, the curvature of the first removable screen and/or the curvature of the agricultural meter housing may be different from one another. Furthermore, while the first removable screen 22 is configured to be coupled to the agricultural meter housing 26 via translation in the direction 44, it should be appreciated that in alternative embodiments, the first removable screen may be configured to be coupled to the agricultural meter housing via translation in the direction 30 (e.g., from an opposite side of the agricultural meter housing). While features of the first removable screen 22 are described herein, it should be appreciated that the second removable screen 24 may include one or more of the features described with reference to the first removable screen 22 (e.g., the first protrusion, the second protrusion, the third protrusion, the flexible portion, etc.). In addition, it should be appreciated that the first removable screen and the second removable screen may have the same configuration (e.g., the first and second removable screens may be interchangeable with one another), or the first removable screen and the second removable screen may have different configurations (e.g., the first and second removable screens may not be interchangeable with one another).

Figure 4:
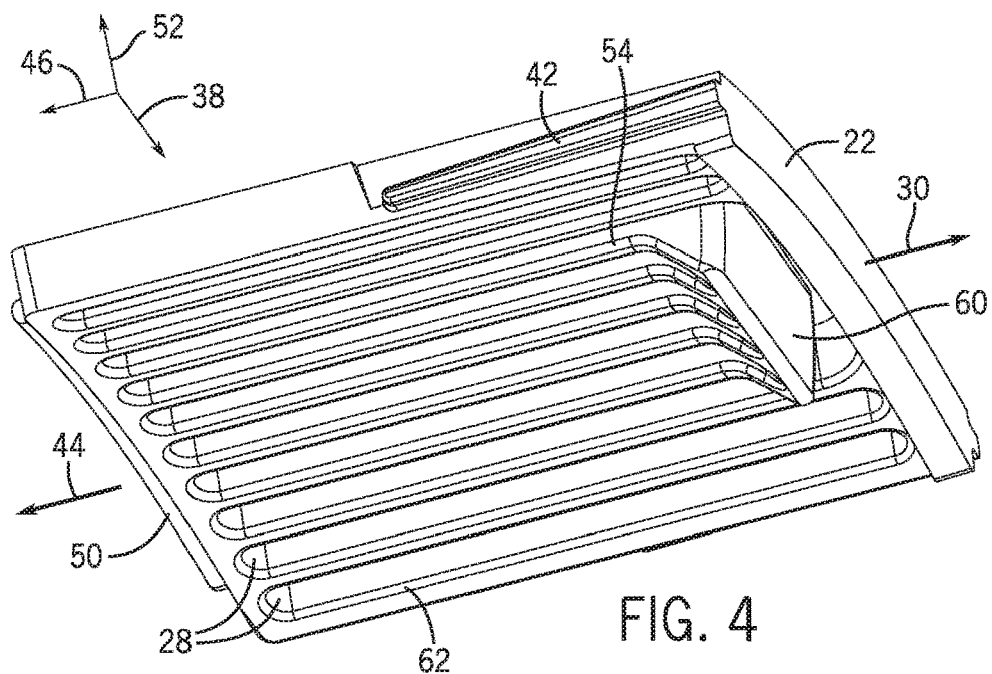
FIG. 4 is a perspective view of the first removable screen of FIG. 2.

FIG. 4 is a perspective view of the first removable screen 22 of FIG. 2. As previously discussed, the first removable screen 22 includes the flexible portion 54 configured to flex upwardly and downwardly along the vertical axis 52. The flexible portion 54 includes an extension 60 configured to contact the inner surface of the agricultural meter housing at the second longitudinal end of the opening. Contact between the extension 60 and the inner surface blocks movement of the first removable screen 22 in the direction 30 along the longitudinal axis 46. To remove the first removable screen 22 from the agricultural meter housing, the flexible portion 54 may be driven (e.g., manually) upwardly along the vertical axis 52 until the extension 60 is positioned vertically above the inner surface. The first removable screen 22 may then be removed from the agricultural meter housing via translation in the direction 30.

In the illustrated embodiment, each slot 28 includes a rounded portion 62 on a bottom side of the first removable screen 22. The rounded portion may enhance the flow characteristics of the air flow into the agricultural product meter and/or may facilitate manufacturing via injection molding (e.g., by improving material flow during injection and/or by improving release from the injection mold). In certain embodiments, the rounded portions of certain slots (e.g., all of the slots) may be omitted. In addition, in certain embodiments, one or more slots may include a rounded portion on a top side of the first removable screen.

Figure 5:
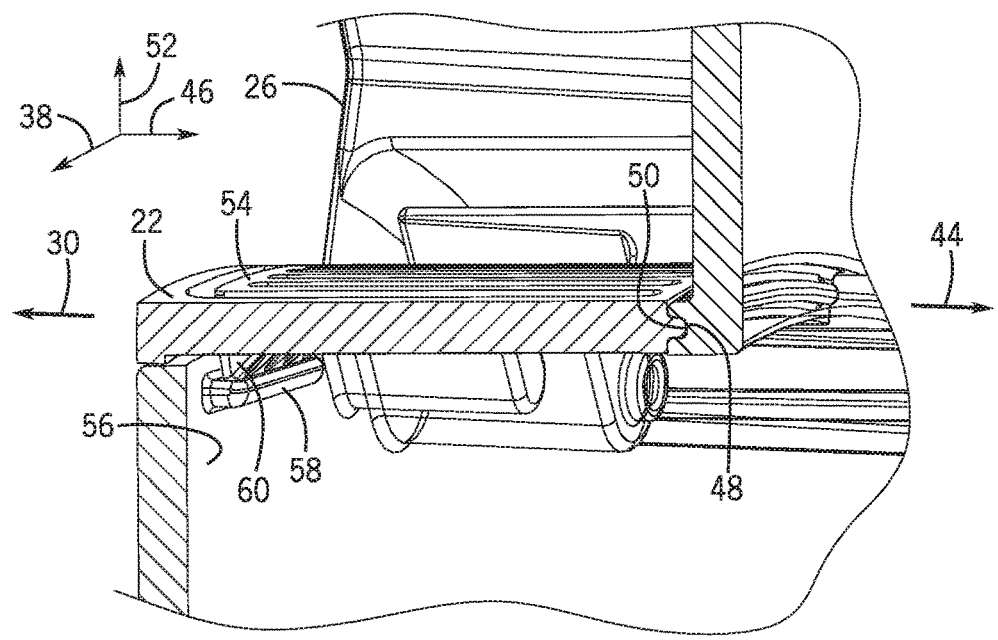
FIG. 5 is a cross-sectional view of the first removable screen and the housing, taken along line 5-5 of FIG. 2.

FIG. 5 is a cross-sectional view of the first removable screen 22 and the housing 26, taken along line 5-5 of FIG. 2. As previously discussed, the first removable screen 22 includes a flexible portion 54 configured to flex upwardly and downwardly along the vertical axis 52. The extension 60 of the flexible portion 54 is configured to contact the inner surface 56 of the agricultural meter housing 26 at the second longitudinal end of the opening. Contact between the extension and the inner surface 56 blocks movement of the first removable air screen 22 in the direction 30 along the longitudinal axis 46. In addition, the lip 58 extending from the inner surface 56 of the agricultural meter housing 26 is configured to contact the extension to block downward movement of the flexible portion 54 along the vertical axis 52 (e.g., in response to a force applied by an operator while removing debris from the first removable screen 22). To remove the first removable screen 22 from the agricultural meter housing 26, the flexible portion may be driven (e g , manually) upwardly along the vertical axis 52 until the extension is positioned vertically above the inner surface 56. The first removable screen 22 may then be removed from the agricultural meter housing 26 via translation in the direction 30.

Figure 6:
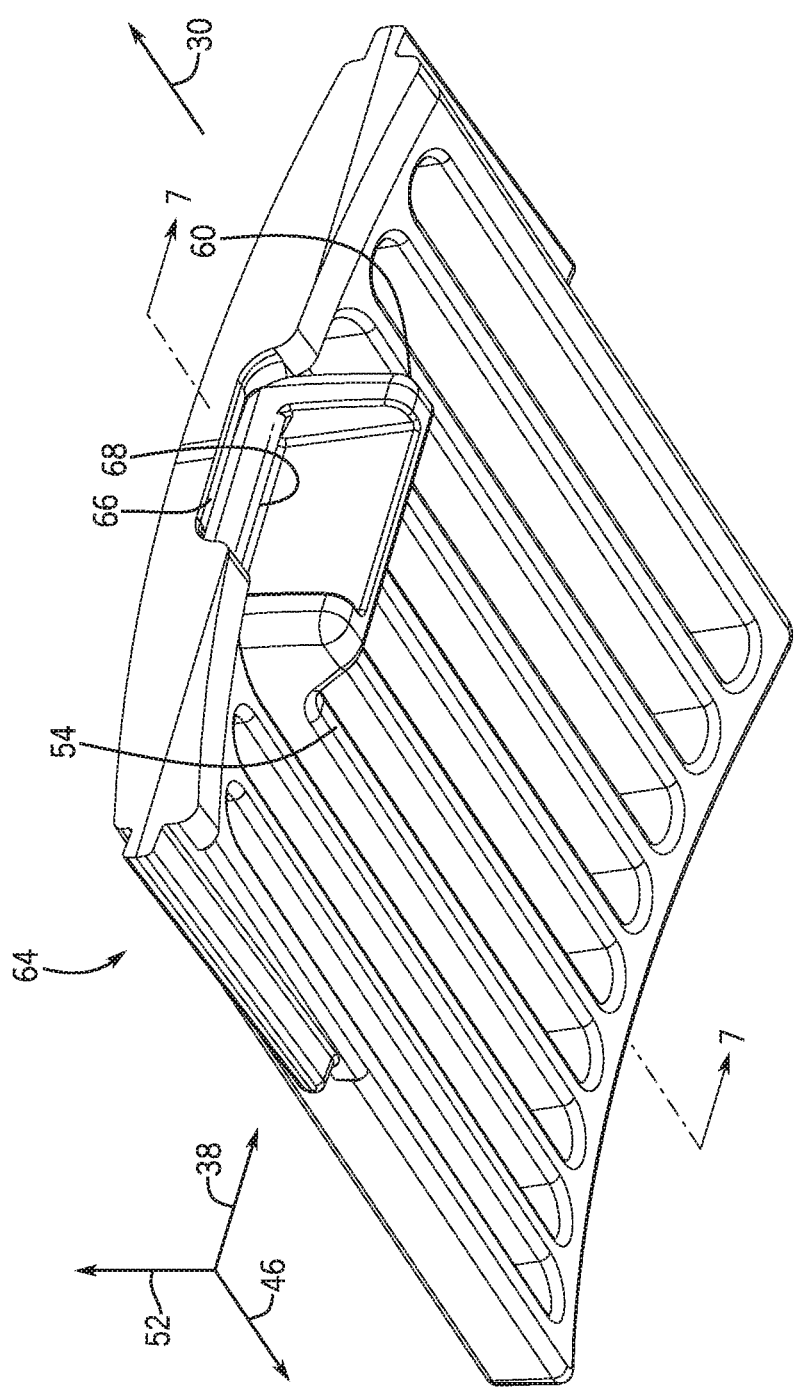
FIG. 6 is a perspective view of an alternative embodiment of a removable screen.

FIG. 6 is a perspective view of an alternative embodiment of a removable screen 64 (e.g., the first removable screen or the second removable screen). In the illustrated embodiment, the removable screen 64 includes a first recess 66 on a second longitudinal side of the removable screen 64 (e.g., opposite the third protrusion on the first longitudinal side of the removable screen) and a second recess 68 on the extension 60 of the flexible portion 54. The first recess 66 establishes a gap between the agricultural meter housing and the removable screen. Accordingly, a tool (e.g., a flat-head screwdriver) may extend through the gap and engage the second recess 68. While the tool is engaged with the second recess, movement of the tool (e.g., rotation of the tool about a contact point between the tool and the agricultural meter housing) may drive the flexible portion 54 upwardly along the vertical axis 52, thereby facilitating removal of the removable screen. For example, to remove the removable screen 64 from the agricultural meter housing, a tip of the tool (e.g., flat-head screwdriver) may be inserted through the gap formed by the first recess 66 and engaged with the second recess 68. The tool may then be rotated to drive the flexible portion 54 upwardly along the vertical axis 52 until the extension 60 is positioned vertically above the inner surface of the agricultural meter housing. The removable screen 64 may then be removed from the agricultural meter housing via translation in the direction 30.

Figure 7:
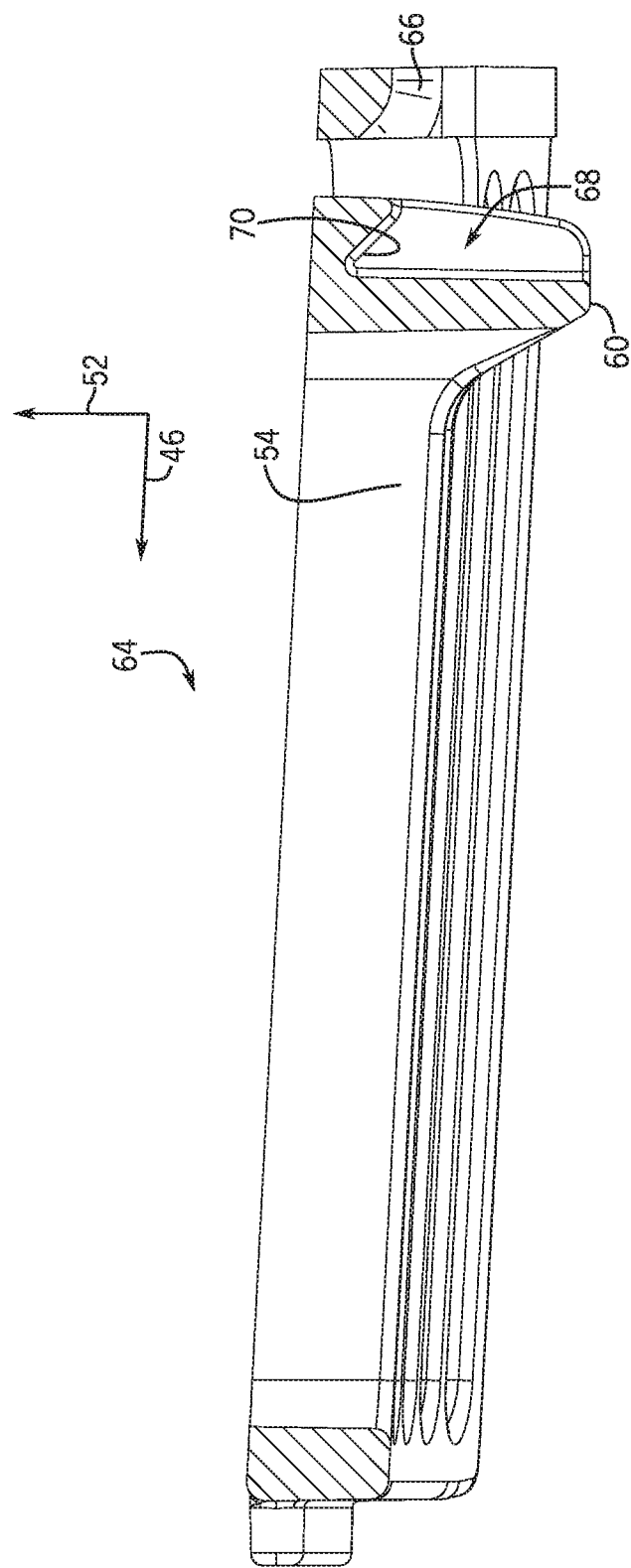
FIG. 7 is a cross-sectional view of the removable screen of FIG. 6, taken along line 7-7.

FIG. 7 is a cross-sectional view of the removable screen of FIG. 6, taken along line 7-7. In the illustrated embodiment, the second recess 68 is formed by an angled surface 70. The angled surface 70 is configured to enable the tip of the tool to rotate while remaining engaged with the second recess 68. However, in alternative embodiments, the recess may be formed by one or more curved surfaces and/or any other suitable surface(s) to facilitate engagement with the tool and to enable the tool to drive the flexible portion 54 upwardly along the vertical axis 52.

While movement of the removable screen in the direction 30 is selectively blocked by contact between the extension and the inner surface of the agricultural meter housing in the embodiments described above, it should be appreciated that in alternative embodiments, movement of the removable screen in the direction 30 may be selectively blocked by other features. For example, in certain embodiments, at least one protrusion of the removable screen may include a detent feature (e.g., detent protrusion) configured to engage a corresponding detent feature (e.g., detent recess) of the agricultural meter housing. In such embodiments, the detent feature may block movement of the removable screen in the direction 30 until a force (e.g., in the direction 30) sufficient to overcome the resistance provided by the detent feature is applied to the removable screen.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An agricultural product metering system, comprising:
an agricultural meter housing having an opening extending from an external environment to an interior of the agricultural meter housing, and at least one mounting feature on at least one peripheral side of the opening, wherein the opening is configured to facilitate a flow of air from a hopper to the interior of the agricultural meter housing; and
an air screen configured to removably couple to the agricultural meter housing to selectively block the opening, wherein the air screen is configured to facilitate the flow of air through the opening from the hopper to the interior of the agricultural meter housing while the air screen is coupled to the agricultural meter housing, the air screen comprises at least one corresponding mounting feature on at least one peripheral side of the air screen, and the at least one corresponding mounting feature of the air screen is configured to engage the at least one mounting feature of the agricultural meter housing to removably couple the air screen to the agricultural meter housing.

2. The agricultural product metering system of claim 1, wherein the at least one mounting feature of the agricultural meter housing comprises at least one recess, and the at least one corresponding mounting feature of the air screen comprises at least one protrusion.

3. The agricultural product metering system of claim 2, wherein the at least one recess comprises a first recess on a first lateral side of the opening and a second recess on a second lateral side of the opening, opposite the first lateral side of the opening, the at least one protrusion comprises a first protrusion on a first lateral side of the air screen and a second protrusion on a second lateral side of the air screen, opposite the first lateral side of the air screen, and the first and second protrusions are configured to engage the first and second recesses via translation of the air screen in a longitudinal direction.

4. The agricultural product metering system of claim 3, wherein a longitudinal extent of the first recess and a longitudinal extent of the second recess are less than a longitudinal extent of the opening, and a longitudinal extent of the first protrusion and a longitudinal extent of the second protrusion are less than a longitudinal extent of the air screen.

5. The agricultural product metering system of claim 3, wherein the at least one recess comprises a third recess on a longitudinal side of the opening, the at least one protrusion comprises a third protrusion on a longitudinal side of the air screen, and the third protrusion is configured to engage the third recess to block vertical movement of the longitudinal side of the air screen relative to the agricultural meter housing.

6. The agricultural product metering system of claim 1, wherein the air screen comprises a flexible portion having an extension, wherein the extension is configured to selectively engage an inner surface of the agricultural meter housing to block movement of the air screen relative to the agricultural meter housing along a longitudinal axis.

7. The agricultural product metering system of claim 6, wherein the agricultural meter housing comprises a lip extending from the inner surface, wherein the lip is configured to contact the extension to block deflection of the flexible portion along a vertical axis.

8. The agricultural product metering system of claim 6, wherein the air screen has a first recess, the extension of the flexible portion has a second recess, the first recess of the air screen is configured to establish a gap between the air screen and the agricultural meter housing that enables a tool to extend through the gap and to engage the second recess of the extension, and the flexible portion is configured to enable the extension to disengage the inner surface of the agricultural meter housing in response to movement of the tool while the tool is engaged with the second recess of the extension.

9. The agricultural product metering system of claim 1, wherein the air screen comprises a plurality of slots configured to facilitate the flow of air through the air screen.

10. The agricultural product metering system of claim 1, comprising the hopper coupled to the agricultural meter housing.

11. An agricultural product metering system, comprising:
an agricultural meter housing having an opening extending from an external environment to an interior of the agricultural meter housing, and at least one mounting feature on at least one peripheral side of the opening, wherein the opening is configured to facilitate a flow of air from a hopper to the interior of the agricultural meter housing, and the at least one mounting feature of the agricultural meter housing is configured to engage at least one corresponding mounting feature on at least one peripheral side of an air screen to removably couple the air screen to the agricultural meter housing such that the air screen covers the opening.

12. The agricultural product metering system of claim 11, wherein the at least one mounting feature of the agricultural meter housing comprises at least one recess, and the at least one corresponding mounting feature of the air screen comprises at least one protrusion.

13. The agricultural product metering system of claim 12, wherein the at least one recess comprises a first recess on a first lateral side of the opening and a second recess on a second lateral side of the opening, opposite the first lateral side of the opening, the at least one protrusion comprises a first protrusion on a first lateral side of the air screen and a second protrusion on a second lateral side of the air screen, opposite the first lateral side of the air screen, and the first and second protrusions are configured to engage the first and second recesses via translation of the air screen in a longitudinal direction.

14. The agricultural product metering system of claim 13, wherein the at least one recess comprises a third recess on a longitudinal side of the opening, the at least one protrusion comprises a third protrusion on a longitudinal side of the air screen, and the third recess is configured to engage the third protrusion to block vertical movement of the longitudinal side of the air screen relative to the agricultural meter housing.

15. The agricultural product metering system of claim 11, comprising the hopper coupled to the agricultural meter housing.

16. An agricultural product metering system, comprising:
a hopper; and
an agricultural meter directly coupled to the hopper, wherein the agricultural meter comprises an agricultural meter housing having an opening extending from an external environment to an interior of the agricultural meter housing, and at least one mounting feature on at least one peripheral side of the opening, wherein the at least one mounting feature of the agricultural meter housing is configured to engage at least one corresponding mounting feature on at least one peripheral side of an air screen to removably couple the air screen to the agricultural meter housing such that the air screen covers the opening.

17. The agricultural product metering system of claim 16, comprising the air screen having the at least one corresponding mounting feature on the at least one peripheral side of the air screen.

18. The agricultural product metering system of claim 17, wherein the air screen comprises a plurality of slots configured to facilitate air flow through the air screen.

19. The agricultural product metering system of claim 16, wherein the at least one mounting feature of the agricultural meter housing comprises at least one recess, and the at least one corresponding mounting feature of the air screen comprises at least one protrusion.

20. The agricultural product metering system of claim 19, wherein the at least one recess comprises a first recess on a first lateral side of the opening and a second recess on a second lateral side of the opening, opposite the first lateral side of the opening, the at least one protrusion comprises a first protrusion on a first lateral side of the air screen and a second protrusion on a second lateral side of the air screen, opposite the first lateral side of the air screen, and the first and second protrusions are configured to engage the first and second recesses via translation of the air screen in a longitudinal direction.

* * * * *